(12) United States Patent
Moorman

(10) Patent No.: US 10,697,539 B2
(45) Date of Patent: Jun. 30, 2020

(54) EVALUATION OF A TORQUE CONVERTER CLUTCH POSITION BASED ON ACCUMULATED SLIP

(71) Applicant: GM Global Technology Operations LLC, Detroit, MI (US)

(72) Inventor: Steven P. Moorman, Dexter, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 155 days.

(21) Appl. No.: 15/969,076

(22) Filed: May 2, 2018

(65) Prior Publication Data

US 2019/0338850 A1 Nov. 7, 2019

(51) Int. Cl.
*F16H 61/14* (2006.01)
*F16D 48/06* (2006.01)

(52) U.S. Cl.
CPC ........... *F16H 61/143* (2013.01); *F16D 48/06* (2013.01); *F16D 2500/1045* (2013.01); *F16D 2500/10412* (2013.01); *F16D 2500/1107* (2013.01); *F16D 2500/3067* (2013.01); *F16D 2500/30401* (2013.01); *F16D 2500/30406* (2013.01); *F16D 2500/30803* (2013.01); *F16D 2500/30816* (2013.01); *F16D 2500/3108* (2013.01); *F16D 2500/31466* (2013.01); *F16D 2500/5108* (2013.01)

(58) Field of Classification Search
CPC .. F16H 61/14; F16H 61/143; F16H 2061/145; F16D 48/06; F16D 2500/30406; F16D 2500/3067; F16D 2500/30816; F16D 2500/5108
See application file for complete search history.

(56) References Cited

U.S. PATENT DOCUMENTS

| | | | |
|---|---|---|---|
| 5,835,876 A * | 11/1998 | Hathaway | F16H 61/12 701/62 |
| 9,435,431 B1 | 9/2016 | Lundberg et al. | |
| 2006/0169036 A1* | 8/2006 | Eguchi | F16D 48/066 73/168 |
| 2016/0017989 A1* | 1/2016 | Shigenaga | F16H 61/12 192/3.29 |

* cited by examiner

*Primary Examiner* — Edwin A Young

(57) ABSTRACT

A system for determining a torque converter clutch is stuck in an engaged position includes a control module, an engine speed sensor, and a transmission speed sensor. The control module evaluates the torque converter clutch by determining a value of a torque converter clutch command. The torque converter clutch command indicates a position of the torque converter clutch. In response to determining that the value of the torque converter clutch command indicates the disengaged position, the control module calculates accumulated slip based on the transmission speed and the engine speed during an evaluation time. In response to determining the evaluation time is complete, the control module compares the accumulated slip with a calibrated threshold of slip. In response to the accumulated slip being less than or equal to the calibrated threshold of slip, the control module determines the torque converter clutch is stuck in the engaged position.

20 Claims, 4 Drawing Sheets

EVALUATION OF A TORQUE CONVERTER CLUTCH POSITION BASED ON ACCUMULATED SLIP

INTRODUCTION

The present disclosure relates to hydraulic transmissions having a torque converter clutch, and more particularly to a system and method for evaluating the torque converter clutch based on accumulated slip to determine when the torque converter clutch is stuck in an on position.

A torque converter couples an engine to a transmission and operates to transfer torque from the engine to the transmission, which in turn transfers torque to the wheels of a motor vehicle. The torque converter includes a clutch, which may be referred to as a torque converter clutch, that is actuated between an engaged and a disengaged position. Sometimes the torque converter clutch gets stuck in the engaged position and may create issues. For example, when the vehicle decelerates and approaches a stop, the torque converter clutch should not be engaged or else the engine stalls. If the torque converter clutch is engaged when the motor vehicle is started in either the park or neutral gear, the engine may stall once the driver shifts into either the reverse or drive gear.

It may be challenging to detect a torque converter clutch stuck in the engaged position when the vehicle is in the park or neutral gear, as the differences in slip with the torque converter clutch engaged and disengaged are relatively small. This issue is especially applicable for low spin loss transmissions having a relatively high k-factor. The k-factor represents a ratio of input speed versus the square root of torque output for the torque converter at any operating point.

In one approach, the system may calculate the absolute slip of the torque converter to determine if the torque converter clutch is stuck in the engaged position. However, since the values of absolute slip of the torque converter are relatively small and within the magnitude of sensor noise when the torque converter clutch is disengaged and the vehicle is in park or neutral gear, this approach is not typically used. Although other approaches exist, they but may not detect the stuck torque converter clutch in time to prevent the engine from stalling. Moreover, when these systems are calibrated to decrease response time, they may generate a false positive indicating the torque converter clutch is stuck.

Accordingly, there is a need for a system that accurately detects a torque converter clutch stuck in the engaged position before the engine stalls.

SUMMARY

A system for evaluating a position of a torque converter clutch is disclosed. Specifically, the disclosed system and method provide an approach for determining if the torque converter clutch is stuck in an engaged position based on calculating accumulated slip of the torque converter. In response to determining the torque converter clutch is stuck in the engaged position, the system performs at least one mitigating action.

In one aspect of the present disclosure, a system for a transmission of a motor vehicle is disclosed. The transmission includes a torque converter having a torque converter clutch configured to be actuated between an engaged position and a disengaged position. The system includes a transmission speed sensor configured to monitor a rotational speed of a transmission input shaft, an engine speed sensor configured to monitor a rotational speed of a crankshaft, and a control module in electric communication with the transmission speed sensor and the engine speed sensor. The control module evaluates the torque converter clutch by determining a value of a torque converter clutch command. The torque converter clutch command indicates a position of the torque converter clutch. In response to determining that the value of the torque converter clutch command indicates the disengaged position, the control module calculates accumulated slip of the torque converter based on the transmission speed and the engine speed during an evaluation time. In response to determining the evaluation time is complete, the control module compares the accumulated slip with a calibrated threshold of slip. In response to the accumulated slip being less than or equal to the calibrated threshold of slip, the control module determines the torque converter clutch is stuck in the engaged position. In response to determining the torque converter clutch is stuck in the engaged position, the control module determines at least one mitigating action.

In another aspect of the present disclosure, the system includes a vehicle speed sensor in electronic communication with the control module, where the vehicle speed sensor indicates vehicle speed.

In yet another aspect of the present disclosure, the system includes a throttle position sensor configured to monitor the position of a throttle body. The throttle position sensor is in communication with the control module.

In still another aspect of the present disclosure, the system includes a transmission fluid temperature sensor in communication with the control module. The transmission fluid temperature sensor is configured to monitor a fluid temperature of the transmission.

In another aspect of the present disclosure, the control module is further configured to evaluate the torque converter clutch by determining the transmission fluid temperature is greater than a threshold temperature. In response to determining the transmission fluid temperature is greater than the threshold temperature, the control module monitors the vehicle speed and the throttle position. The control module determines a clutch apply speed based on the vehicle speed and the throttle position, where the clutch apply speed represents a threshold vehicle speed at which the torque converter clutch is instructed to actuate into the engaged position for a given throttle position. In response to determining the vehicle speed is less than or equal to the clutch apply speed, the control module sets the value of the torque converter clutch command to the disengaged position.

In yet another aspect of the present disclosure, the system includes a transmission range sensor in electric communication with the control module. The transmission range sensor is configured to send a transmission range value to the control module indicating a position of a selector lever.

In still another aspect of the present disclosure, the evaluation time and the calibrated threshold of slip are based on the position of the selector lever.

In another aspect of the present disclosure, the control module determines the accumulated slip based on:

$$\text{Accumulated Slip} = \Sigma_0^{Evaluation\ Time}(N_{engine} - N_{turbine})$$

where $N_{engine}$ is the rotational speed of the crankshaft and $N_{turbine}$ is the rotational speed of the transmission input shaft.

In yet another aspect of the present disclosure, the control module determines an average error offset based on:

$$\text{Average Error Offset} = \frac{\sum_0^{\text{Evaluation Time}} (N_{engine} - N_{Turbine})}{\text{Evaluation Time}}$$

where $N_{engine}$ is the rotational speed of the crankshaft and $N_{turbine}$ is the rotational speed of the transmission input shaft.

In still another aspect of the present disclosure, the control module determines a corrected value for the accumulated slip based on:

$$\text{Corrected Slip} = \Sigma_0^{\text{Evaluation Time}}(N_{engine} - N_{turbine} - \text{Average Error Offset})$$

where the corrected slip is the correct value of the accumulated slip.

In another aspect of the present disclosure, the control module includes a counter, and wherein the counter is incremented in response to determining the accumulated slip is less than or equal to the calibrated threshold of slip.

In yet another aspect of the present disclosure, the control module determines the torque converter clutch is stuck in the engaged position based on a value of the counter being equal to or greater than a threshold number of failed evaluations.

In another aspect of the present disclosure, a method of determining a torque converter clutch of a transmission is stuck in an engaged position is disclosed. The method includes monitoring, by a computer, a transmission speed sensor for a rotational speed of a transmission input shaft. The method also includes monitoring, by the computer, an engine speed sensor for a rotational speed of a crankshaft. The method further includes determining, by the computer, a value of a torque converter clutch command, wherein the torque converter clutch command indicates a position of the torque converter clutch. In response to determining that the value of the torque converter clutch command indicates the disengaged position, the method includes calculating accumulated slip based on the transmission speed and the engine speed during an evaluation time. In response to determining the evaluation time is complete, the method includes comparing the accumulated slip with a calibrated threshold of slip. In response to the accumulated slip being less than or equal to the calibrated threshold of slip, the method includes determining the torque converter clutch is stuck in the engaged position. In response to determining the torque converter clutch is stuck in the engaged position, the method includes determining at least one mitigating action.

In yet another aspect of the disclosure, a system for a transmission of a motor vehicle is disclosure. The transmission has a torque converter with a torque converter clutch configured to be actuated between an engaged position and a disengaged position. The system includes a transmission speed sensor configured to monitor a rotational speed of a transmission input shaft, an engine speed sensor configured to monitor a rotational speed of a crankshaft, a vehicle speed sensor indicating vehicle speed, a throttle position sensor configured to monitor a throttle body position, a transmission fluid temperature sensor configured to monitor a fluid temperature of the transmission, and a control module. The control module is in electric communication with the transmission speed sensor, the engine speed sensor, the vehicle speed sensor, the throttle position sensor, and the transmission fluid temperature sensor. The control module is configured to evaluate the torque converter clutch by determining the transmission fluid temperature is greater than a threshold temperature. In response to determining the transmission fluid temperature is greater than the threshold temperature, the control module monitors the vehicle speed and the throttle position. The control module determines a clutch apply speed based on the vehicle speed and the throttle position. The clutch apply speed represents a threshold vehicle speed at which the torque converter clutch is instructed to actuate into the engaged position for a given throttle position. In response to determining the vehicle speed is less than or equal to the clutch apply speed, the control module sets the value of the torque converter clutch command to the disengaged position. In response to setting the value of the torque converter clutch command indicates the disengaged position, the control module calculates accumulated slip based on the transmission speed and the engine speed during an evaluation time. In response to determining the evaluation time is complete, the control module compares the accumulated slip with a calibrated threshold of slip. In response to the accumulated slip being less than or equal to the calibrated threshold of slip, the control module determines the torque converter clutch is stuck in the engaged position. In response to determining the torque converter clutch is stuck in the engaged position, the control module determines at least one mitigating action.

Further aspects and advantages of the present disclosure will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1:
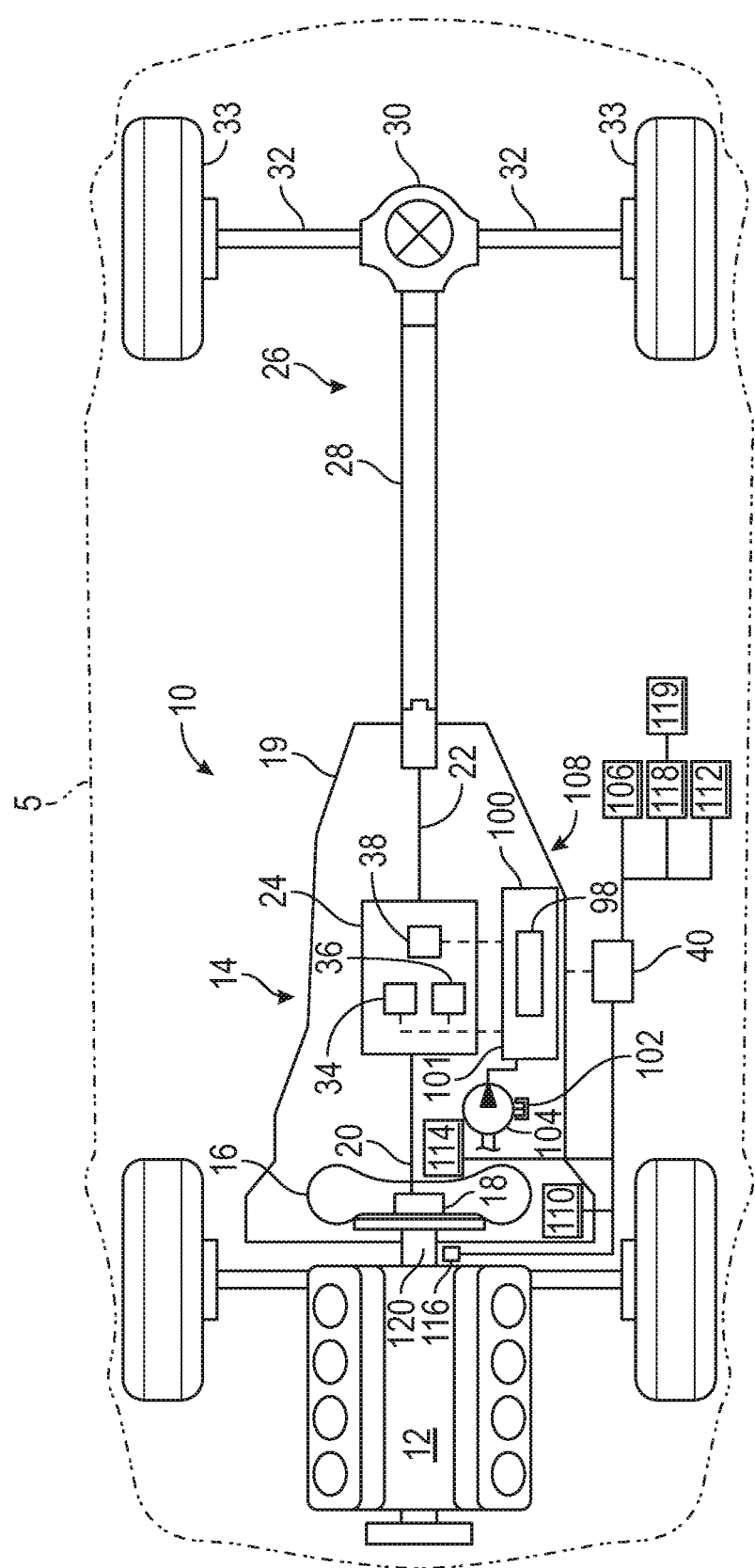
FIG. 1 is a diagram of an exemplary powertrain having a system for detecting a torque converter clutch stuck in an engaged position according to an exemplary embodiment.

With reference to FIG. 1, a motor vehicle is illustrated and generally indicated by reference number 5. The motor vehicle 5 is illustrated as a passenger car, but it should be appreciated that the motor vehicle 5 may be any type of vehicle such as, but not limited to, a truck, van, or a sport-utility vehicle. The motor vehicle 5 includes an exemplary powertrain 10. It should be appreciated at the outset that while a rear-wheel drive powertrain has been illustrated, the motor vehicle 5 may have a front-wheel drive powertrain without departing from the scope of the present disclosure. The powertrain 10 generally includes an engine 12 interconnected with a transmission 14. The transmission 14 includes a torque converter 16 and a torque converter clutch 18. The torque converter clutch 18 is configured to be actuated between an engaged position and a disengaged position. As explained below, the disclosure provides an approach for determining when the torque converter clutch 18 is stuck in the engaged position and determines at least one mitigating action in response to detecting the stuck condition.

Continuing to refer to FIG. 1, the engine 12 may be an internal combustion engine or an electric engine, hybrid engine, or any other type of prime mover, without departing from the scope of the present disclosure. The engine 12 supplies a driving torque to the transmission 14 through the torque converter 16. When in the engaged position, the torque converter clutch 18 mechanically couples the output of the engine 12 to the input of the transmission 14. Therefore, a 1:1 ratio between the engine 12 and the transmission 14 exists. Likewise, there is no mechanical connection between the output of the engine 12 and the input of the transmission 14 when the torque converter clutch 18 is in the disengaged position.

In one non-limiting embodiment, the transmission 14 is a continuously variable transmission. However, it should be appreciated that the transmission 14 may be any type of hydraulic transmission having a torque converter and clutch. For example, in another embodiment the transmission 14 may be a planetary gear transmission. The transmission 14 includes a cast metal housing 19 that encloses and protects various components of the transmission 14. The housing 19 includes a variety of apertures, passageways, shoulders, and flanges (not shown) for positioning and supporting various internal components. The transmission 14 includes a transmission input shaft 20 and a transmission output shaft 22. Disposed between the transmission input shaft 20 and the transmission output shaft 22 is a powerflow arrangement 24 of gears, clutches, and pulleys. The transmission input shaft 20 is functionally interconnected with the engine 12 via the torque converter 16 and receives input torque or power from the engine 12. The transmission output shaft 22 may be connected to a final drive unit 26.

In the exemplary embodiment as shown in FIG. 1, the final drive unit 26 includes a propshaft 28, a differential assembly 30, and drive axles 32. The drive axels 32 are connected to wheels 33 of the motor vehicle 5. The transmission input shaft 20 is coupled to and provides drive torque to the powerflow arrangement 24. The powerflow arrangement 24 includes a forward clutch 34, a reverse clutch or brake 36, and a pulley assembly 38. The powerflow arrangement 24 may also include a plurality of gear sets, a plurality of shafts, and additional clutches or brakes. The plurality of gear sets may include individual intermeshing gears, such as planetary gear sets, that are connected to or selectively connectable to the plurality of shafts through the selective actuation of the plurality of clutches/brakes. The plurality of shafts may include layshafts or countershafts, sleeve and center shafts, reverse or idle shafts, or combinations thereof. The forward clutch 34 is selectively engageable to initiate a forward drive mode while the reverse clutch or brake 36 is selectively engageable to initiate a reverse drive mode. The pulley assembly 38 is a continuously variable unit that includes a chain or belt wrapped between a primary pulley and a secondary pulley (not shown). Translation of the pulleys correlates to movement of the belt or chain which continuously varies the output or gear ratio of the transmission 14.

The transmission 14 includes a transmission control module 40. The transmission control module 40 is an electronic control device having a preprogrammed digital computer or processor, control logic or circuits, memory used to store data, and at least one I/O peripheral. The control logic includes or enables a plurality of logic routines for monitoring, manipulating, and generating data and control signals. The transmission control module 40 controls the actuation of the forward clutch 34, the reverse clutch or brake 36, the pulley assembly 38, and the torque converter clutch 18 via a hydraulic system 100. In another example, the transmission control module 40 is an engine control module (ECM), or a hybrid control module, or any other type of controller.

The hydraulic system 100 is disposed within a valve body 101 that contains various components of the hydraulic system 100. These components include, but are not limited to, pressure regulation valves, directional valves, and solenoids. Specifically, in the embodiment as shown in FIG. 1 the hydraulic system 100 includes an actuator 98 such as, for example, a solenoid for controlling the position of the torque converter clutch 18. The valve body 101 of the hydraulic system 100 may be attached to a bottom portion 108 of the transmission housing 19 in rear-wheel drive transmissions. However, the valve body 101 may be attached to a front of the transmission housing 19 in front-wheel drive transmissions. The hydraulic system 100 is operable to selectively engage the clutches/brakes 34, 36, 18 and to provide cooling and lubrication to the transmission 14 by selectively communicating a hydraulic fluid from a sump 102 under pressure from either an engine driven pump 104 or an accumulator (not shown). The pump 104 may be driven by the engine 12 or by an auxiliary engine or electric motor.

The clutch actuator 98 is configured to control the pressure of the hydraulic fluid provided to the torque converter clutch 18. Specifically, the clutch actuator 98 is actuated between an opened and closed position by the hydraulic system 100. Opening and closing the clutch actuator 98 actuates the torque converter clutch 18 between the engaged and the disengaged positions. If the clutch actuator 98 is in the open position, then the torque converter clutch 18 is in the engaged position. Similarly, when the clutch actuator 98 is in the closed position, then the torque converter clutch 18 is disengaged.

The opening and closing of the clutch actuator 98 is controlled by the transmission control module 40. It is to be appreciated that in some circumstances the clutch actuator 98 may fail. That is, the clutch actuator 98 may become stuck in either the open position or the closed position. When the clutch actuator 98 is stuck in the closed position, the torque converter clutch 18 is unable to engage. Similarly, when the clutch actuator 98 is stuck in the open position the torque converter clutch 18 remains engaged. As explained in greater detail below, the disclosure provides an approach for determining that the torque converter clutch 18 is stuck in the engaged position (i.e., the clutch actuator 98 failed in the open position).

The transmission control module 40 is in electronic communication with the clutch actuator 98 via any wired connection such as, for example, a vehicle bus network. The transmission control module 40 transmits a torque converter clutch command that is received as input by the clutch actuator 98. The torque converter clutch command instructs the clutch actuator 98 to either open or close. In other words, the transmission control module 40 generates a torque converter clutch command which in turn instructs the torque converter clutch 18 on or off, which in turn engages and disengages the torque converter clutch 18

The transmission control module 40 determines the torque converter clutch command based on a plurality of operating parameters of the motor vehicle 5. As seen in FIG. 1, the transmission control module 40 is in electronic communication with a plurality of sensors that monitor operating conditions of the motor vehicle 5. Specifically, the transmission control module 40 is in electric communication with a transmission range sensor 106, a temperature sensor 110 configured to monitor a fluid temperature of the transmission 14, a vehicle speed sensor 112, a transmission speed sensor 114, an engine speed sensor 116, and a throttle position sensor 118. As explained in detail below, the torque converter clutch command instructs the torque converter clutch 18 off (i.e., to be disengaged) in response to determining that the fluid temperature of the transmission 14 is less than or equal to a threshold temperature. In response to determining the fluid temperature of the transmission 14 is greater than the fluid temperature of the transmission, then the torque converter clutch command is based on the throttle position, vehicle speed, and a position of the transmission selector lever (not shown).

The transmission range sensor 106 may also be referred to as a transmission range switch. The transmission range sensor 106 is configured determine a position of the transmission selector lever (not shown). The transmission range sensor 106 send a transmission range value to the transmission control module 40 indicating the position of the transmission selector lever. Specifically, the transmission range value may indicate a positive or other value indicting that the selector lever is positioned in park or neutral or, alternatively, the transmission range value may indicate a negative or other value indicating the selector lever is positioned in another gear (e.g., drive or neutral position).

The vehicle speed sensor 112 is configured to monitor a speed of the wheels 33, where the speed of the wheels 33 are indicative of the vehicle speed. The transmission speed sensor 114, which may also be referred to as a turbine speed sensor, is configured to monitor the rotational speed of the transmission input shaft 20. The engine speed sensor 116 is configured to monitor the rotational speed of the engine's crankshaft 120. The throttle position sensor 118 monitors the position of a throttle body 119. The throttle body 119 is configured to regulate the flow of fuel or air to the engine 12 and may be controlled in part by driver input. Specifically, a driver may press down on a gas pedal (not shown) to allow for the throttle body 119 to open and allow more air to the engine. The position of the throttle body 119 may be expressed as a percentage of opening. For example, in one vehicle operating at idle the throttle position may be about 5% and when the vehicle operates at wide open throttle (WOT) the throttle position may be about 90%.

The torque converter clutch command is sent to clutch actuator 98. In response to receiving the torque converter clutch command, the clutch actuator 98 is actuated into either the open or closed position. Actuating the clutch actuator 98 actuates the torque converter clutch 18 into either the engaged or disengaged position. As explained in detail below, the torque converter clutch 18 is normally in the engaged position when torque multiplication by the torque converter 16 is not required. Likewise, the torque converter clutch 18 is normally the disengaged position with torque multiplication is required.

The torque converter clutch 18 is normally in the disengaged position in response to transmission control module 40 determining the transmission fluid temperature is less than the predetermined temperature. The transmission fluid is heated to the predetermined temperature during operation of the motor vehicle 5 first before the torque converter clutch 18 may be engaged. The transmission fluid is heated to the predetermined temperature, which in turn reduces viscosity. It is to be appreciated that reducing the viscosity also reduces the parasitic viscous losses that are attributed to the transmission fluid. Reducing the parasitic viscous losses attributed to the transmission fluid may increase fuel economy of the motor vehicle 5. In one exemplary embodiment, the predetermined temperature is about 20 degrees Celsius.

Figure 4:
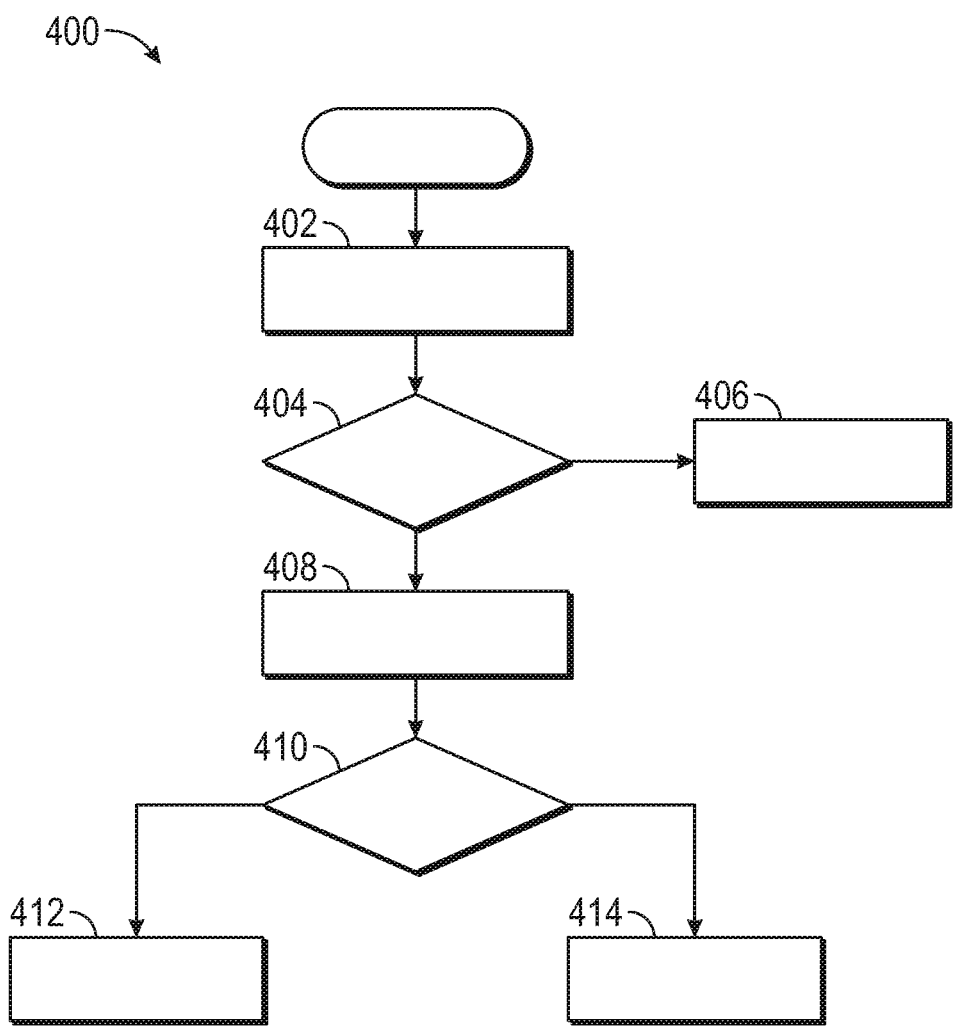
FIG. 4 is a process flow diagram illustrating a method for determining the position of the torque converter clutch according to an exemplary embodiment.

In response to determining the fluid temperature of the transmission 14 is less than or equal to the threshold temperature, the transmission control module 40 generates a torque converter clutch command instructing the torque converter clutch to turn off. In response to determining that the fluid temperature of the transmission 14 is about the threshold temperature, the transmission control module 40 determines the position of the torque converter clutch based on the throttle position and vehicle speed. Specifically, in response to the vehicle speed being less than or equal to a clutch apply speed, the transmission control module 40 determines the torque converter clutch 18 is disengaged (i.e., value of the torque converter clutch command indicates the disengaged position). Similarly, in response to determining the vehicle speed is greater than the clutch apply speed, the transmission control module 40 determines the torque converter clutch 18 is engaged (i.e., the value of the torque converter clutch command indicates the engaged position). The clutch apply speed represents a threshold vehicle speed at which the torque converter clutch 18 is instructed to actuate into the engaged position for a given throttle position. A method 400 for determining the position of the torque converter clutch 18 is described in greater detail below and is shown in FIG. 4.

Continuing to refer to FIG. 1, the memory of the transmission control module 40 may store a plurality of look-up tables that indicate the position of the torque converter clutch 18 based on throttle position and vehicle speed. Specifically, the look-up tables indicate the clutch apply speed at which the torque converter clutch 18 is supposed to be commanded into the engaged position for a given throttle position. For example, if the throttle position is about 30% then the torque converter clutch 18 may remain disengaged until the vehicle speed is about 25 kilometers per hour (kph). That is, the clutch apply speed when the throttle position is about 30% is 25 kph. For example, in a mid-range throttle position, which may range from about 20% to about 40%, then the clutch apply vehicle speed is about 25 kph. When the throttle body 119 is situated in a high throttle position, which is greater than about 50%, then the clutch apply speed may be about 35 kph. Therefore, it should be appreciated that the torque converter clutch 18 remains disengaged when the vehicle operates at or below 15 kph. When the vehicle operates above 15 kph, then the speed at which the torque converter clutch 18 is engaged increases with throttle position. The torque converter clutch 18 is not engaged in any other transmission range position other than drive.

As explained in greater detail below, the transmission control module 40 determines when the torque converter clutch 18 is stuck in the engaged position. That is, the transmission control module 40 determines the torque converter clutch 18 is engaged, however according to the operating conditions of the motor vehicle 5 the torque converter clutch 18 should be disengaged. In response to determining the torque converter clutch 18 is stuck in the engaged position, the transmission control module 40 determines at least one mitigating action. Specifically, in one embodiment the transmission control module 40 generates a diagnostic trouble code (DTC) indicating the torque converter clutch 18 is stuck in the engaged position. The transmission control module 40 also disables a torque converter clutch apply hydraulic circuit (not shown) that is part of the hydraulic system 100. Disabling the torque converter clutch apply hydraulic circuit forces the clutch actuator 98 to close, which in turn forces the torque converter clutch 18 into the disengaged position.

The transmission control module 40 determines that the torque converter clutch 18 is stuck in the engaged based on accumulated slip of the torque converter 16. It is to be appreciated that accumulated slip considers the slip between the engine 12 and the transmission input shaft 20 during a window of time, which may be referred to as an evaluation time. In other words, the accumulated slip is calculated by summing the torque converter slip detected during the evaluation time. Specifically, the accumulated slip is calculated by summing the torque converter slip detected in each software loop time during the evaluation time. The software loop time refers to the time between successive executions of software code. In one example, the time required to execute an individual software loop is about 6.25 milliseconds. As explained below, the evaluation time is a variable value that is determined based on the transmission fluid temperature and/or the engine speed. In contrast to the accumulated slip approach, absolute slip considers the slip experienced at a specific point in time. However, since the magnitude of torque converter slip is relatively small and within the magnitude of system noise, it may be challenging to set threshold values that reliably detect a stuck torque converter clutch condition based on absolute slip.

The accumulated slip of the torque converter 16 is determined by Equation 1, which is:

$$\text{Accumulated Slip} = \Sigma_0^{Evaluation\ Time}(N_{engine} - N_{turbine})$$

where $N_{engine}$ is engine speed (i.e., the rotational speed of the crankshaft 120) and $N_{turbine}$ is turbine speed (i.e., the speed of the transmission input shaft 20). The transmission control module 40 determines that the torque converter clutch 18 is locked or stuck in the engaged position if Equation 2 is true:

Accumulated Slip<Cal Threshold of Slip during Evaluation Time

That is, the transmission control module 40 determines that the torque converter clutch 18 is stuck in the engaged position when the accumulated slip is less than the calibrated threshold of accumulated slip at the end of the evaluation time. The calibrated threshold of accumulated slip represents a threshold value of slip that is observed during the evaluation time. It is to be appreciated that the value of the calibrated threshold of accumulated slip may be determined based on actual test data, and depends upon the transmission range value (i.e., the position of the gear selection lever). The calibrated threshold of slip is greater than the accumulated slip experienced when the torque converter clutch 18 is stuck in the engaged position, and less than the accumulated slip when the torque converter clutch 18 is disengaged. This ensures that the system reliably and accurately detects when the torque converter clutch 18 is stuck in the engaged position.

The transmission control module 40 determines a value of the evaluation time based on various operating conditions of the motor vehicle 5 such as a transition time of the torque converter 16, the torque converter slip, and the transmission range value. For example, in one embodiment the evaluation time ranges from about 0.4 to about 2 seconds based on the operating conditions of the motor vehicle 5. The transition time represents an amount of time for the torque converter 16 to transition from a positive to a negative accumulated slip or, alternatively, from a negative to a positive accumulated slip when the torque converter clutch 18 is disengaged. For example, the torque converter may transition when a motor vehicle coasts to a stop or when throttle is depressed and released when the vehicle is in the park or neutral gear. It is to be appreciated that the evaluation time is greater than the transition time.

The values of the transition time of the torque converter 16 and the torque converter slip are based on the transmission fluid temperature and the engine speed. Specifically, the torque converter slip may decrease as the transmission fluid temperature increases because of a reduction in parasitic viscous (i.e., the temperature of the transmission fluid increases viscosity decreases, thereby making the transmission fluid less thick). The torque converter slip may decrease as the engine speed increases because of reduced bushing and bearing losses.

The transmission control module 40 monitors the transmission speed sensor 114 and the engine speed sensor 116 to determine the accumulated slip based on Equation 1, which is expressed above. The transmission control module 40 evaluates the torque converter slip by comparing the accumulated slip with the calibrated threshold of accumulated slip. In response to determining the value of the accumulated slip is less than the value of the threshold of accumulated slip, the transmission control module 40 determines that the evaluation has failed. In one embodiment, the transmission control module 40 may require two or more consecutive failed evaluations before determining that the torque converter clutch 18 is stuck in the engaged position. Requiring consecutive failed evaluations may increase the accuracy and robustness of the system.

Figure 3:
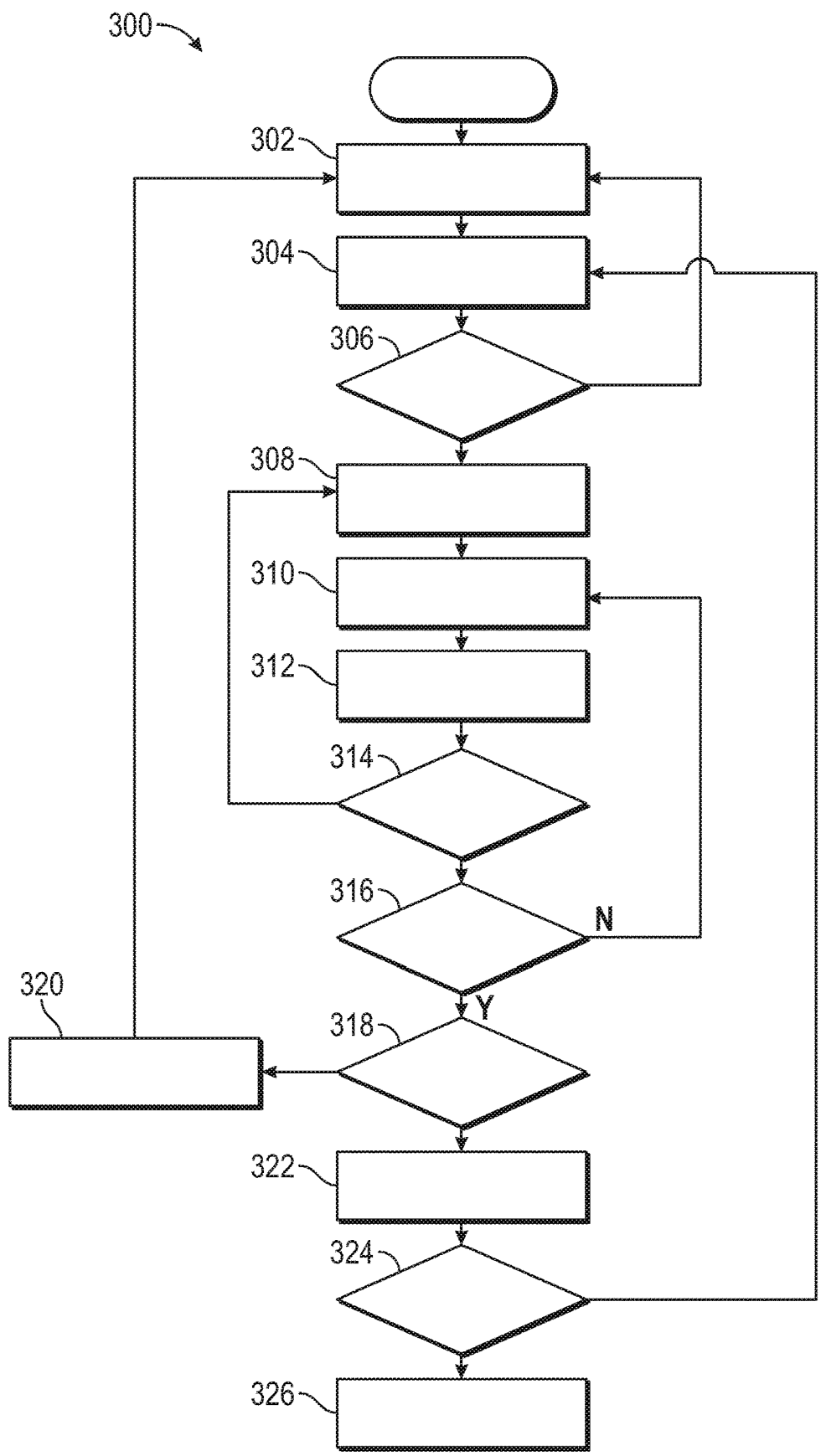
FIG. 3 is a process flow diagram illustrating a method of determining that the torque converter clutch is stuck in the engaged position according to an exemplary embodiment.

When evaluating the position of the torque converter clutch 18, the transmission control module 40 first sets a counter to zero. The counter is incremented by one each time an evaluation fails. The evaluation involves determining the value of the torque converter clutch command sent to the clutch actuator 98. Specifically, the transmission control module 40 determines if the torque converter clutch command instructs the clutch actuator 98 to turn the torque converter clutch 18 on (i.e., engaged) or off (i.e., disengaged). In response to determining that torque converter clutch command instructs the torque converter clutch 18 off, then the transmission control module 40 starts an evaluation timer. The transmission control module 40 then determines if the torque converter clutch 18 is stuck in the engaged position by calculating the accumulated slip during the evaluation time. A process flow diagram illustrating a method 300 of evaluating the torque converter clutch 18 is explained in greater detail below and is illustrated in FIG. 3.

Still referring to FIG. 1, the torque converter clutch 18 may be stuck in the engaged position during any number of operating conditions of the motor vehicle 5. In one embodiment, the transmission control module 40 determines that the torque converter clutch 18 is stuck in the engaged position during startup. Specifically, the transmission control module 40 determines that the torque converter clutch 18 is stuck in the engaged position before a garage shift (i.e., when a driver initially shifts the selector lever from either the park or neutral position into the reverse or drive position). In another embodiment, the transmission control module 40 determines the torque converter clutch 18 is stuck in the engaged position as the motor vehicle 5 decelerates and comes to a stop. In response to determining the torque converter clutch 18 is engaged, the transmission control module 40 disables the torque converter clutch apply circuit (not shown) and generates a DTC.

Figure 2:
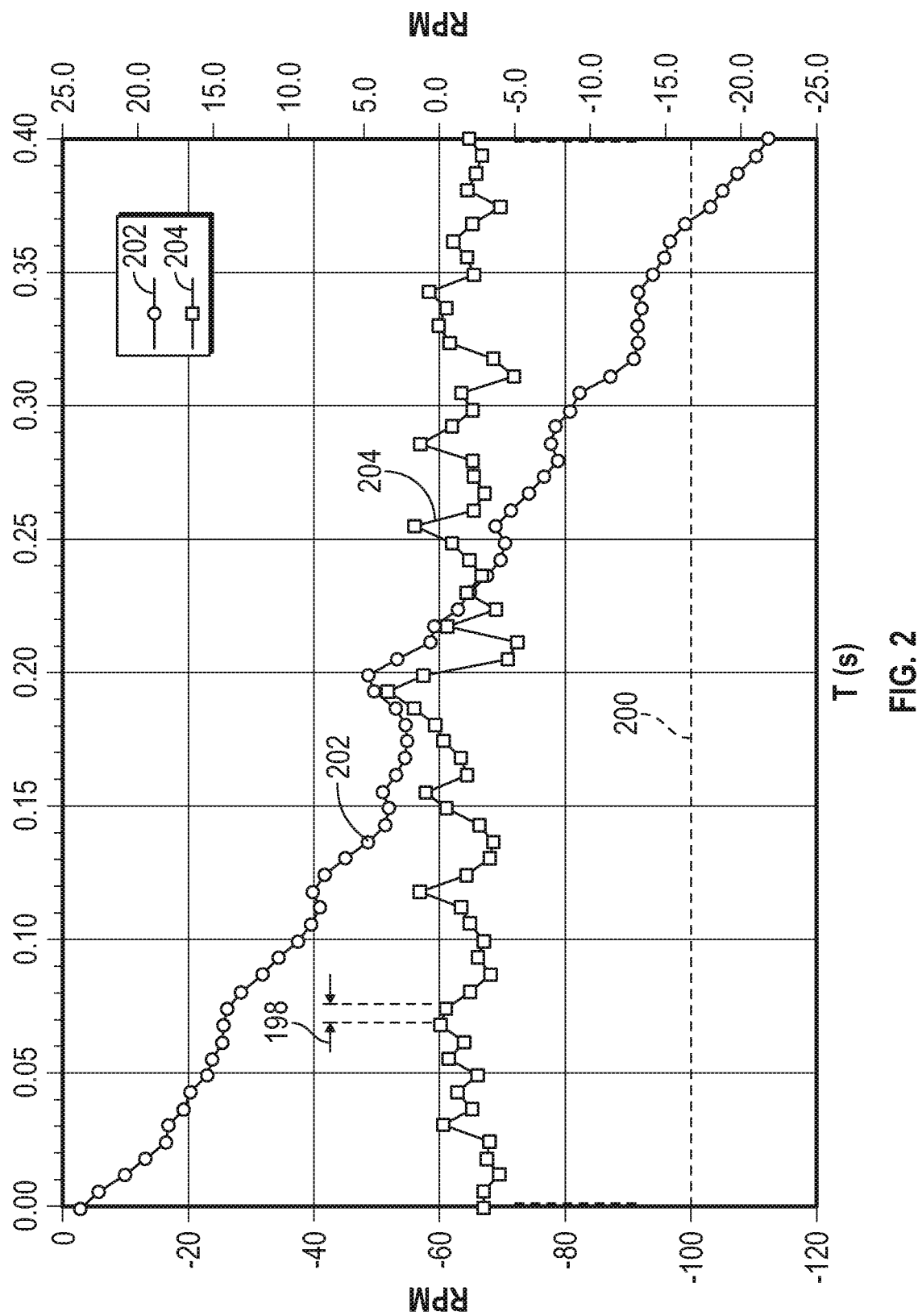
FIG. 2 is a graph illustrating operating conditions of the system shown in FIG. 1, where the torque converter clutch is stuck in the engaged position according to an exemplary embodiment.

FIG. 2 is an exemplary graph illustrating absolute slip and accumulated slip over an evaluation time of about 0.4 seconds. The embodiment as shown in FIG. 2 also includes a software loop time 198 of about 0.01 seconds. The left axis represents accumulated slip and the right axis represents absolute slip. The horizontal axis represent time (measured in seconds). The calibrated threshold of slip 200 is shown in FIG. 2 as a dashed line. Line 202 represents the accumulated slip and line 204 represents the absolute slip. As seen in FIG. 2, the accumulated slip 202 starts at almost 0 RPM and reaches about −115 RPM at the end of the evaluation time. The calibrated threshold of accumulated slip 200 is about −100 RPM. As seen in FIG. 2, the value of the accumulated slip 202 reaches the calibrated threshold of accumulated slip 200 at about 0.37 seconds, which is less than the evaluation time of about 0.4 seconds. Therefore, the evaluation illustrated in FIG. 2 is marked as passed. However, if the value of the accumulated slip 202 had not reached the calibrated threshold of slip 200 within 0.4 seconds, then the evaluation would have been marked as failed.

Turning back to FIG. 1, it is to be appreciated that both the transmission speed sensor 114 and the engine speed sensor 116 have some level of accuracy error. The accuracy of a sensor (e.g., the transmission speed sensor 114 or the engine speed sensor 116) represents the maximum difference that exists between the actual value and the indicated value at the output of the sensor. Sometimes the accuracy error of the sensors 114, 116 may accumulate over time and result in the transmission control module 40 incorrectly determining that the torque converter clutch 18 is not stuck in the engaged position.

In one embodiment, the transmission control module 40 may correct the accumulated error of the transmission speed sensor 114 and the engine speed sensor 116. Specifically, the transmission control module 40 first determines the average error offset of the transmission speed sensor 114 and the engine speed sensor 116 when the torque converter clutch 18 is in a full lock mode. The full lock mode represents when the torque converter clutch 18 is operating normally in the engaged position (i.e., the torque converter clutch 18 is not stuck in the engaged position) to mechanically couple the output of the engine 12 to the input of the transmission 14. As previously explained, the torque converter clutch 18 is normally in the engaged position when torque multiplication by the torque converter 16 is not required. The average error offset is determined by Equation 3, which is:

$$\text{Average Error Offset} = \frac{\sum_0^{Evaluation\ Time}(N_{engine} - N_{Turbine})}{\text{Evaluation Time}}$$

where $N_{engine}$ is engine speed and $N_{turbine}$ is turbine speed (i.e., the speed of the transmission input shaft 20).

Once the average error offset is determined, the transmission control module 40 determines a corrected value for the accumulated slip. The corrected accumulated slip is determined by Equation 4, which is:

$$\text{Corrected Slip} = \Sigma_0^{Evaluation\ Time}(N_{engine} - N_{turbine} - \text{Average Error Offset})$$

FIG. 3 is an exemplary process flow diagram illustrating a method 300 for detecting a torque converter clutch 18 stuck in the engaged position. Referring generally to both FIGS. 1 and 3, the method may begin at block 302. In block 302, the transmission control module 40 sets the counter to zero. The method may then proceed to block 304.

In block 304, the transmission control module 40 determines the value of the torque converter clutch command sent to the clutch actuator 98. A process for determining the value of the torque converter clutch command is described below and shown in FIG. 4. Turning back to FIG. 3, the method may then proceed to decision block 306.

In decision block 306, if the transmission control module 40 determines the torque converter clutch command is engaged then the method returns to block 302 where the counter is set to zero. In response to determining the value of the torque converter clutch command is disengaged, then the method 300 proceeds to block 308.

In block 308, the transmission control module 40 starts the evaluation timer. The method 300 may then proceed to block 310.

In block 310, the transmission control module 40 monitors the transmission speed sensor 114 for the rotational speed of the transmission input shaft 20 and the engine speed sensor 116 for the rotational speed of the engine's crankshaft 120. The method 300 may then proceed to block 312.

In block 312, the transmission control module 40 calculates the accumulated slip based on the rotational speed of the transmission input shaft 20 and the rotation speed of the engine crankshaft 120 based on Equation 1. The method 300 may then proceed to decision block 314.

In decision block 314, the transmission control module 40 compares the accumulated slip calculated at a specific point in time with the calibrated threshold of accumulated slip. In response to determining that the accumulated slip is greater than the calibrated threshold of slip, the evaluation timer is set to zero and the method returns to block 308. In other words, in one embodiment if the calibrated threshold of slip has been reached before the evaluation time has expired, then the transmission control module 40 may perform a fast pass. A fast pass refers to a situation when the system does not need to wait for the evaluation time to expire, since it is already apparent that the torque converter clutch 18 is disengaged. However, in response to determining that the accumulated slip is equal to or less than the calibrated threshold of slip (i.e., no fast pass may occur), then the method 300 proceeds to block 316.

In decision block 316, the transmission control module 40 determines if the evaluation time has expired. In response to determining that the evaluation time has not expired, the method 300 returns to block 310. In response to determining that the evaluation time has expired, the method 300 proceeds to decision block 318.

In block 318, the transmission control module 40 compares the accumulated slip calculated over the evaluation time with the calibrated threshold of accumulated slip. In response to determining that the accumulated slip is greater than the calibrated threshold of slip, the method 300 proceeds to block 320. In block 320, the transmission control module 40 determines that the torque converter clutch 18 is not stuck in the engaged position. The method 300 may then return to block 302.

In response to determining that the accumulated slip is equal to or less than the calibrated threshold of slip, then the accumulated slip has not passed evaluation. Accordingly, the method 300 proceeds to block 322.

In block 322, the transmission control module 40 increments the counter by a value of one. The method may then proceed to decision block 324.

In decision block 324, the transmission control module 40 compares the value of the counter with a threshold number of failed evaluations. In one example, the threshold number of failed evaluations include two consecutive failed evaluations. In response to determining that the value of the counter is less than the threshold number of failed evaluations, the method 300 may then return to block 304. In response to determining the value of the counter is greater than or equal to the threshold number of failed evaluations, the transmission control module 40 determines that the torque converter clutch 18 is stuck in the engaged position. The method may then proceed to block 326.

In block 326, the transmission control module 40 performs at least one mitigating action. For example, the torque converter clutch 18 may be forced to disengage. The transmission control module 40 may also generate one or more DTCs indicating that the torque converter clutch is stuck in the engaged position. The method 300 may then terminate.

FIG. 4 is an exemplary process flow diagram illustrating a method 400 for determining the value of the torque converter clutch command. Referring generally to FIGS. 1 and 4, the method begins at block 402. In block 402, the transmission control module 40 monitors the transmission fluid temperature sensor 110. The method 400 may then proceed to decision block 404.

In decision block 404, the transmission control module 40 compares the transmission fluid temperature with a threshold temperature of the transmission fluid. In response to determining the fluid temperature of the transmission 14 is less than or equal to the threshold temperature, the method 400 proceeds to block 406. In block 406, the transmission control module 40 generates a torque converter clutch command instructing the torque converter clutch to turn off. The method 400 may then terminate.

In response to determining that the fluid temperature of the transmission 14 is greater than the threshold temperature, the method 400 proceeds to block 408.

In block 408, the transmission control module 40 monitors the vehicle speed sensor 112 for the vehicle speed and throttle position sensor 118 monitors the position of the throttle body 119. The method 400 may then proceed to decision block 410.

In decision block 410, the transmission control module 40 determines the value of the torque converter clutch command. Specifically, if the vehicle speed is less than or equal to the clutch apply speed, then the method 400 proceeds to block 412 where value of the torque converter clutch command is set to disengaged. However, if the vehicle speed is greater than the clutch apply speed, then the method 400 proceeds to block 414 where value of the torque converter clutch command is set to engaged. The method 400 may then terminate.

Referring generally to the figures, the disclosed system provides an effective approach for determining when the torque converter clutch is stuck in the engaged position. In some operating conditions, the motor vehicle is initially started and then shifted into the drive gear. For example, a driver may start the vehicle and shift into the drive gear within a matter of a couple of seconds. The disclosed system provides an approach for detecting a stuck torque converter clutch while the vehicle is still in park or neutral and mitigates the stuck condition by disengaging the torque converter clutch before the vehicle is shifted into park or reverse. Disengaging the torque converter clutch substantially prevents the engine from stalling. In another example, the motor vehicle may reduce speed and come to a stop while the torque converter clutch is stuck in the engaged position, which may lead to the engine stalling. The disclosed system also detects the stuck torque converter clutch in a timely fashion in these operating conditions as well, thereby substantially preventing engine stalling as the vehicle comes to a stop.

Other approaches have been used to detect a stuck torque converter clutch such as monitoring the absolute slip. However, monitoring absolute slip is not typically used since it does not always detect a stuck clutch. Furthermore, the alternatives to absolute slip may not detect the stuck condition in time before the engine stalls or may falsely detect a stuck torque converter clutch. In contrast, the disclosed approach of monitoring accumulated slip may provide greater reliability and accuracy. This is because there are observable differences in accumulated torque converter slip comparing when comparing the engaged an engaged and disengaged positions, even at very low levels of slip. Furthermore, the disclosed system may learn the error of the speed sensors during normal operating conditions when the torque converter clutch is locked. The disclosed system may consider the error of speed sensors, which in turn increases accuracy and robustness of the system.

The description of the disclosure is merely exemplary in nature and variations that do not depart from the general essence of the disclosure are intended to be within the scope of the disclosure. Such variations are not to be regarded as a departure from the spirit and scope of the disclosure The following is claimed:

1. A system for a transmission of a motor vehicle, the transmission including a torque converter having a torque converter clutch configured to actuate between an engaged position and a disengaged position, the system comprising:
a transmission speed sensor configured to monitor a rotational speed of a transmission input shaft that represents a transmission speed;
an engine speed sensor configured to monitor a rotational speed of a crankshaft that represents an engine speed; and
a control module in electric communication with the transmission speed sensor and the engine speed sensor, the control module configured to:
determine a value of a torque converter clutch command, wherein the torque converter clutch command indicates a position of the torque converter clutch;
in response to determining that the value of the torque converter clutch command indicates the disengaged position, calculate accumulated slip based on the transmission speed and the engine speed during an evaluation time;
in response to determining the evaluation time is complete, compare the accumulated slip with a calibrated threshold of slip;
in response to the accumulated slip being less than or equal to the calibrated threshold of slip, determine the torque converter clutch is stuck in the engaged position; and
in response to determining the torque converter clutch is stuck in the engaged position, determine at least one mitigating action.

2. The system of claim 1, further comprising:
a vehicle speed sensor in electronic communication with the control module, wherein the vehicle speed sensor indicates vehicle speed.

3. The system of claim 2, further comprising:
a throttle position sensor configured to monitor the position of a throttle body, wherein the throttle position sensor is in communication with the control module.

4. The system of claim 3, further comprising:
a transmission fluid temperature sensor in communication with the control module, wherein the transmission fluid temperature sensor is configured to monitor a fluid temperature of the transmission.

5. The system of claim 4, wherein the control module is further configured to evaluate the torque converter clutch by:

determining the transmission fluid temperature is greater than a threshold temperature;

in response to determining the transmission fluid temperature is greater than the threshold temperature, monitoring the vehicle speed and the throttle body position;

determining a clutch apply speed based on the vehicle speed and the throttle body position, wherein the clutch apply speed represents a threshold vehicle speed at which the torque converter clutch is instructed to actuate into the engaged position for a given throttle position; and in response to determining the vehicle speed is less than or equal to the clutch apply speed, setting the value of the torque converter clutch command to the disengaged position.

6. The system of claim 1, further comprising:
a transmission range sensor in electric communication with the control module, wherein the transmission range sensor is configured to send a transmission range value to the control module indicating a position of a selector lever.

7. The system of claim 6, wherein the evaluation time and the calibrated threshold of slip are based on the position of the selector lever.

8. The system of claim 1, wherein the control module determines the accumulated slip based on:

Accumulated Slip=$\Sigma_0^{Evaluation\ Time}(N_{engine}-N_{turbine})$ wherein $N_{engine}$ is the rotational speed of the crankshaft and $N_{turbine}$ is the rotational speed of the transmission input shaft.

9. The system of claim 1, wherein the control module determines an average error offset based on:

$$\text{Average Error Offset} = \frac{\sum_0^{Evaluation\ Time}(N_{engine}-N_{Turbine})}{\text{Evaluation Time}}$$

wherein $N_{engine}$ is the rotational speed of the crankshaft and $N_{turbine}$ is the rotational speed of the transmission input shaft.

10. The system of claim 9, wherein the control module determines a corrected value for the accumulated slip based on:

Corrected Slip=$\Sigma_0^{Evaluation\ Time}(N_{engine}-N_{turbine}-\text{Average Error Offset})$ wherein corrected slip is the correct value of the accumulated slip.

11. The system of claim 1, wherein the control module includes a counter, and wherein the counter is incremented in response to determining the accumulated slip is less than or equal to the calibrated threshold of slip.

12. The system of claim 11, wherein the control module determines the torque converter clutch is stuck in the engaged position based on a value of the counter being equal to or greater than a threshold number of failed evaluations.

13. A method of determining a torque converter clutch of a transmission is stuck in an engaged position, the method comprising:

monitoring, by a computer, a transmission speed sensor for transmission speed that represents a rotational speed of a transmission input shaft;

monitoring, by the computer, an engine speed sensor for an engine speed that represents a rotational speed of a crankshaft;

determining, by the computer, a value of a torque converter clutch command, wherein the torque converter clutch command indicates a position of the torque converter clutch;

in response to determining that the value of the torque converter clutch command indicates a disengaged position, calculating accumulated slip based on the transmission speed and the engine speed during an evaluation time;

in response to determining the evaluation time is complete, comparing the accumulated slip with a calibrated threshold of slip;

in response to the accumulated slip being less than or equal to the calibrated threshold of slip, determining the torque converter clutch is stuck in the engaged position; and in response to determining the torque converter clutch is stuck in the engaged position, determining at least one mitigating action.

14. The method of claim 13, further comprising:
monitoring, by the computer, a vehicle speed sensor, wherein the vehicle speed sensor indicates vehicle speed.

15. The method of claim 14, further comprising:
monitoring, by the computer, a throttle position sensor that indicates a throttle body position.

16. The method of claim 15, further comprising:
monitoring, by the computer, a transmission fluid temperature sensor for a fluid temperature of the transmission.

17. The method of claim 16, further comprising:
determining, by the computer, the transmission fluid temperature is greater than a threshold temperature;

in response to determining the transmission fluid temperature is greater than the threshold temperature, monitoring the vehicle speed and the throttle body position;

determining a clutch apply speed based on the vehicle speed and the throttle body position, wherein the clutch apply speed represents a threshold vehicle speed at which the torque converter clutch is instructed to actuate into the engaged position for a given throttle position; and in response to determining the vehicle speed is less than or equal to the clutch apply speed, setting the value of the torque converter clutch command to the disengaged position.

18. The method of claim 13, further comprising:
determining, by the computer, an average error offset based on:

$$\text{Average Error Offset} = \frac{\sum_0^{Evaluation\ Time}(N_{engine}-N_{Turbine})}{\text{Evaluation Time}}$$

wherein $N_{engine}$ is the rotational speed of the crankshaft and $N_{turbine}$ is the rotational speed of the transmission input shaft.

19. The method of claim 18, further comprising:
determining, by the computer, a corrected value for the accumulated slip based on:

Corrected Slip=$\Sigma_0^{Evaluation\ Time}(N_{engine}-N_{turbine}-\text{Average Error Offset})$ wherein corrected slip is the correct value of the accumulated slip.

20. A system for a transmission of a motor vehicle, the transmission having a torque converter with a torque converter clutch configured to be actuated between an engaged position and a disengaged position, the system comprising:
- a transmission speed sensor configured to monitor a rotational speed of a transmission input shaft that represents a transmission speed;
- an engine speed sensor configured to monitor a rotational speed of a crankshaft that represents an engine speed;
- a vehicle speed sensor indicating vehicle speed;
- a throttle position sensor configured to monitor a throttle body position;
- a transmission fluid temperature sensor configured to monitor a fluid temperature of the transmission; and
- a control module in electric communication with the transmission speed sensor, the engine speed sensor, the vehicle speed sensor, the throttle position sensor, and the transmission fluid temperature sensor, the control module configured to:
  - determine the transmission fluid temperature is greater than a threshold temperature;
  - in response to determining the transmission fluid temperature is greater than the threshold temperature, monitor the vehicle speed and the throttle body position;
  - determine a clutch apply speed based on the vehicle speed and the throttle body position, wherein the clutch apply speed represents a threshold vehicle speed at which the torque converter clutch is instructed to actuate into the engaged position for a given throttle position;
  - in response to determining the vehicle speed is less than or equal to the clutch apply speed, set a value of a torque converter clutch command to the disengaged position;
  - in response to setting the value of the torque converter clutch command to the disengaged position, calculate accumulated slip based on the transmission speed and the engine speed during an evaluation time;
  - in response to determining the evaluation time is complete, compare the accumulated slip with a calibrated threshold of slip;
  - in response to the accumulated slip being less than or equal to the calibrated threshold of slip, determine the torque converter clutch is stuck in the engaged position; and
  - in response to determining the torque converter clutch is stuck in the engaged position, determine at least one mitigating action.

* * * * *